(12) United States Patent
Hundscheidt et al.

(10) Patent No.: US 7,958,254 B2
(45) Date of Patent: Jun. 7, 2011

(54) METHOD AND DEVICE FOR PERFORMING FLOOR CONTROL

(75) Inventors: Frank Hundscheidt, Kerkrade (NL); Ralf Keller, Würselen (DE); Thorsten Lohmar, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 991 days.

(21) Appl. No.: 10/521,379

(22) PCT Filed: Aug. 5, 2002

(86) PCT No.: PCT/EP02/08731
§ 371 (c)(1),
(2), (4) Date: Oct. 12, 2005

(87) PCT Pub. No.: WO2004/015920
PCT Pub. Date: Feb. 19, 2004

(65) Prior Publication Data
US 2006/0155839 A1  Jul. 13, 2006

(51) Int. Cl.
*G06F 15/16* (2006.01)
(52) U.S. Cl. .................................................. 709/232
(58) Field of Classification Search .................. 709/204, 709/232; 715/755; 725/93, 116, 146
See application file for complete search history.

(56) References Cited

U.S. PATENT DOCUMENTS

| | | | |
|---|---|---|---|
| 5,844,553 A * | 12/1998 | Hao et al. | 715/733 |
| 7,299,290 B2 * | 11/2007 | Karpoff | 709/231 |
| 7,366,780 B2 * | 4/2008 | Keller et al. | 709/227 |
| 2002/0086665 A1 * | 7/2002 | Maggenti et al. | 455/416 |
| 2006/0155839 A1 * | 7/2006 | Hundscheidt et al. | 709/224 |

FOREIGN PATENT DOCUMENTS

JP  A H7 322229  12/1995

OTHER PUBLICATIONS

Author: Sun Wei, Lee Bu Sung, Yeo Chai Kiat. Title: JMS: A Flexible Collaorative Environment. Date: Feb. 1999 [retrieved on Oct. 30, 2008]. Retrieved from applicant submitted prior art. Pertinent pp. 195-202.*
Dommel et al.—"Floor control for multimedia conferencing and collaboration", Multimedia Systems, 1997.*
Sun Wei et al: "JMS: a flexible collaborative environment" Internet Workshop, 1999, Piscataway, NJ, USA, IEEE, US, February 18, 1999, pp. 195-202, XP010365607, ISBN: 0-7803-5925-9 p. 196, left-hand column, paragraph 2—p. 199, left-hand column, paragraph 2 p. 199, right-hand column, paragraph 3—p. 200, right-hand column paragraph 1 p. 201, left-hand column, paragraph 4—right-hand column, paragraph 4 Figures 2, 3.

(Continued)

*Primary Examiner* — J Bret Dennison

(57) ABSTRACT

A method of controlling a floor controller (14) of a communications network (8) including a group of network components (14, 16) which receive a data stream (12) from a data source (10) is described. The method comprises the steps of selecting the network component (14, 16) which is to control the data source (10), receiving a control instruction from at least one of the network components (16), the control instruction relating to a control of the data source (10), and, in response to receipt of the control instruction from the selected network component (16), triggering the transmission of a corresponding session control command to the data source (10).

11 Claims, 8 Drawing Sheets

OTHER PUBLICATIONS

Sun Wei et al: "JMS-Java based meeting space" Journal of Organizational Computing & Electronic Commerce, 'Online! vol. 10, No. 3, 2000, pp. 171-188, XP002236671 Retrieved from the Internet: <URL:http://ninetta.ingentaselect.com/v1=1264846/c1=32/nw=1/rpsv/catchword/erlbaum/10541721/v10n3/s2/p171> 'retrieved on Mar. 31, 2003 p. 176, paragraph 4—p. 184, paragraph 2, figures 2,4. Dynamic Access Control Method for Controlling remote AV Devices in Teleconference environment.

Sun Wei, et al.: "JMS—Java based meeting space" Journal of Organizational Computing & Electronic Commerce, vol. 10, No. 3, 2000, pp. 171-188, XP002236671.

* cited by examiner

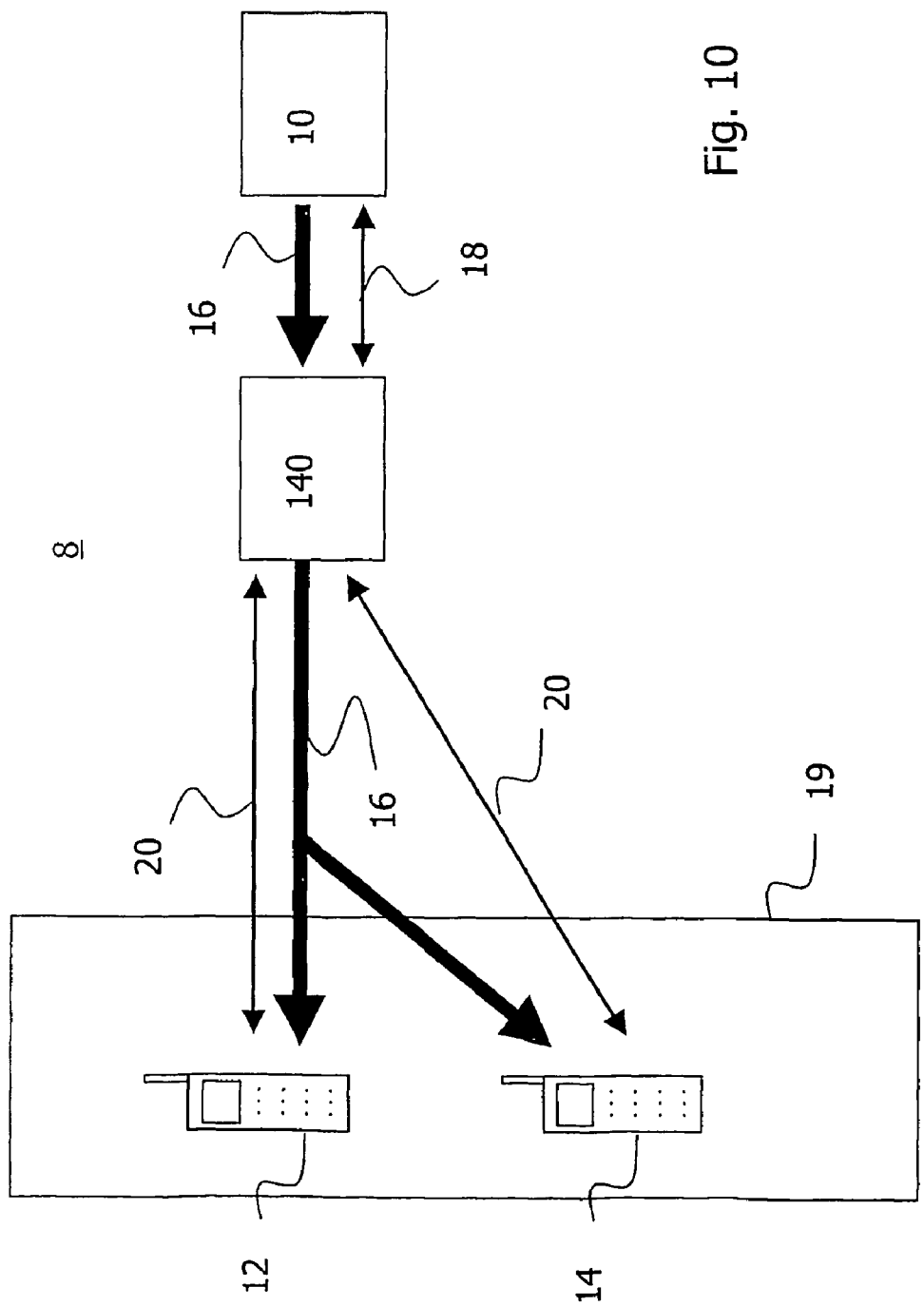

METHOD AND DEVICE FOR PERFORMING FLOOR CONTROL

BACKGROUND OF THE INVENTION

1. Technical Field

The invention relates to the field of controlling a data source which generates a data stream that is received by two or more components of a communications network. In particular, the invention relates to aspects in context with conferring control of the data source among the individual network components.

2. Description of the Prior Art

Due to increasing capacities of modern wire-line and wireless communications networks, novel network applications like real-time teleconferencing or collective video-on-demand have become feasible. Such conference-like network application require the management of interaction among the individual participating network components.

A typical scenario which requires the management of interaction is a streaming session during which two or more network components receive a data stream from a streaming source like a multimedia server. Various protocols for controlling a streaming session are known in the art. As an example the Real Time Streaming Protocol, or RTSP, specified in the Internet Engineering Task Force (IETF) document RFC 2326; Real Time Streaming Protocol (RTSP); April 1998 can be mentioned. RTSP is an application-level protocol for controlling the delivery of data with real-time properties such as audio and video data. Sources of data can comprise live data feeds and stored clips. Session control according to RTSP includes both setting up and controlling the data stream so that RTSP can be visualized as a "network remote control" for multimedia servers.

When a streaming session has been set up, individual network components may be invited to participate in the streaming session. This process is exemplarily described in chapter 16.2 "Invitation to a Multicast Conference" of the IETF document RFC 2543; SIP: Session Initiation Protocol; March 1999.

According to SIP, only the initiator of a session controls the session. Further network components participating in the session have a passive role. This might lead to the situation that a specific session gets out of control if the session initiator can or does not control the session any longer. Furthermore, the session always has to be terminated when the session initiator wishes to leave the session.

There is a need for an improved control mechanism for scenarios in which a plurality of network components participate in the session. Furthermore, there is a need for hardware components implementing such a control mechanism and a user interface appropriately configured to operate such a control mechanism.

SUMMARY OF THE INVENTION

The existing need is satisfied according to the invention by a method of controlling a floor controller of a communications network including a group of network components which are configured to receive a data stream from a data source, the method comprising the steps of selecting the network component which is to control the data source, receiving a control instruction from at least one network component, the control instruction relating to a control of the data source, and, in response to receipt of the control instruction from the selected network component, triggering the transmission of a corresponding session control command to the data source.

In the following, the terminology used in the context of the present invention will be explained first.

In the context of the present invention, the processes of floor control and session control are distinguished. Session control defines the process of controlling the data source. The network component executing session control is called session controller. Floor control relates to the task of selecting the network component that is to control the data source, i.e. the process of selecting the session controller. Optionally, the process of floor control may relate additionally to the task of transferring the right to select the session controller, i.e. the right to confer floor control.

Different instructions and commands are used to exert floor control and session control. For example floor control instructions concern the control of processes like requesting, denying and granting session or floor control, whereas session control instructions relate to the control of the data source by commands like PLAY, PAUSE, STOP, etc. Session control commands basically fulfill the same tasks like session control instructions. However, whereas session control instructions may or may not be readable by the data source, session control commands are always readable by the data source.

The individual network components of the communications network may have different rolls. For example a floor controller, which may or may not belong to the group of network components receiving the data stream, is the network component that performs floor control. The network component which performs session control is called session controller as explained before.

The floor controller, the session controller or any other network component may own direct access to the data source. Such an owner of direct access communicates directly with the data source, preferably translates session control instructions into session control commands (e.g. triggered by the floor controller), and sends session control commands via this direct access to the data source.

A network component owning direct access to the data source and additionally having floor control is called direct floor controller. The tasks of floor control and session control and the ownership of the direct access may be assigned to a single network component or to different network components.

Between the individual network components various channels may be established. In the context of the present invention, a floor control channel is a channel that is used for the transmission of floor control instructions for purposes like requesting, granting of denying session or floor control (i.e. floor control instructions for carrying out the floor control process). A session control channel on the other hand is a channel that is used for the transfer of session control commands or session control instructions.

For example a gaming, a gambling, or a streaming session, which might have been initiated by the floor controller or by another network component, may be controlled by one or more individual network components of the group of network components via the floor controller. In other words, the floor controller may constitute for session control purposes an interfacing device between one or more network components of the group of network components and the data source. The floor controller can thus fulfill the task of ignoring, discarding or granting requests for session control or the task of merging control instructions from various network components, including himself. Preferably, all session control commands received by the data source previously have been released by the floor controller.

A control instruction received by or generated within the floor controller may relate to various aspects with respect to the control of the data source. Preferably, the control instruction relates to a control of the data stream which is or will be received by the group of network components. For example, the control instruction may initiate the data stream or may affect the data stream in another way. The control instruction may be a session control command or have a content that can be translated into a session control command. Session control commands can be sent from the floor controller to the data source or the floor controller triggers a further network component owning the direct access to send a session control command to the data source.

If the data stream which is received by the group of network components belongs to e.g. a streaming or gaming session that was initiated by the floor controller, this initial floor controller will in most cases initially not only have floor control but also session control. As has been pointed out above, the main task of the floor controller is to confer this session control to individual network components of the group of network components which receive the data stream. However, the floor controller may also confer floor control to one of these network components as part of the floor control process. In the case floor control is passed to a network components of the group of network components, the initial floor controller partially or completely loses its task of selecting the network component which is to control the data source. This has the advantage that the initial floor controller can do other things which renders the method more flexible.

A network component receiving floor control may confer floor control at a later point in time back to the initial floor controller or to another network component of the group of network components receiving the data stream. A previous floor controller may confer floor control to a subsequent floor controller in many ways. For example, a push mechanism could be implemented according to which the previous floor controller actively instructs the subsequent floor controller to take over floor control. Furthermore, a pull mechanism could be used according to which the previous floor controller gives away floor control in response to a request for floor control from the subsequent floor controller.

In principle, control of the data source, i.e. session control, may be handed over in a similar manner like floor control. This means that the floor controller may for example instruct a specific network component to take over session control (push mechanism) or hand over session control upon receipt of a request for session control from one of the network components (pull mechanism).

To grant session control is part of the floor control process. The floor controller may be aware of the passed session control, i.e. the floor controller may know who currently exerts session control. Preferably, other network components of the group of network components are also aware about which network component is floor controller and which one is session controller.

In addition or as an alternative to passing floor and/or session control, direct access to the data source may be passed also. As has been defined above, direct access relates to a direct connection between the data source and one of the networks components which is the owner of the direct access. Session control commands are transferred from the owner of the direct access to the data source for controlling purposes.

Initially, a session initiator, i.e. the network component that initiates the session, typically has the ownership of the direct access and typically acts (initially) as both floor and session controller. In the course of a streaming session initiated by the session initiator, the session initiator may confer at least one of session control, floor control and direct access to one or more further network components. Preferably, the session initiator confers in a first step session control to another network component which thus becomes session controller. The session initiator will, however, keep floor control and direct access and therefore fulfills the task of a direct floor controller. In a second step, the session initiator additionally confers floor control to another networks component which thus becomes floor controller. After having passed both session and floor control, the session initiator may permanently keep direct access to the data source or may confer direct access to another network component in a third step.

Conferring floor control as well as session control may be virtual or non-virtual depending on whether or not the network component to which floor or session control is conferred has direct access to the data source. For example in the case of virtual session control hand over, session control may be conferred from a direct floor controller to another network component. Thus, the direct access channel between the data source and the direct floor controller is merely extended from the direct floor controller to the network component that has taken over session control. One task of the direct floor controller is then to translate session control instructions received from the session controller into session control commands and to send the session control commands to the date source.

Various combinations of conferring and non-conferring of the ownership of the direct access, session control and floor control are possible. In general, implementations wherein the session initiator remains the owner of the direct access during the lifetime of the session are advantageous regarding implementing effort compared to implementations wherein the direct access is conferred. The reason is the following: when the direct access is conferred, the data source is involved in the conferring process and must be informed at least about the replacement of the previous owner by the subsequent owner, e.g. the previous owner of the direct access has to terminate the direct access and a new direct access may have to be established between the subsequent owner of the direct access and the data source. Authentication and authorization procedures may have to be executed in parallel.

On the other hand, implementations allowing the conferring of the direct access are advantageous especially for the owner of the direct access typically being the session initiator. Conferring the direct access has the advantage that the owner of the direct access, e.g. the session initiator, can leave the session. Especially if charging applies to the owner of the direct access, the previous owner of the direct access, e.g. the session initiator, can confer the direct access to a further network component when a certain budget is exceeded without having to terminate the session. In this case, the further network component acts as owner of the direct access and can be adequately charged for the session or the part of the session relating to its ownership of the direct access. A variant which can be implemented easily uses a permanent direct access and permanent floor control localized for the time of the session at the session initiator. Session control can be passed between the network components.

The part of the floor control process which relates to selecting the network component that is to control the data source can be executed in various ways, e.g. the floor controller can instruct the selected network component to take over the session control. The take over can be achieved by one or more floor control instructions, e.g. by a push mechanism pushing the instruction from the floor controller to the selected network component. Alternatively, a particular one of the network components may request session control (pull mechanism). This request for session control can be achieved in different ways. Firstly, the particular network component may send a floor control instruction to the floor controller in the sense that the particular network component requests transfer of the session control to itself. The floor controller can e.g. accept, ignore or reject this explicit request. If the floor controller accepts the request for session control, the session control is conferred to the requesting network component that subsequently can start sending one or more session control instructions.

According to a second possible solution, the particular network component may send instead of a floor control instruction a session control instruction, e.g. PAUSE, to the floor controller. The floor controller can again accept, ignore or reject the received session control instruction. By accepting the received session control instruction, the floor controller selects the sending network component as session controller at least for the received session control instruction. Additionally, if the floor controller accepts the received session control instruction, the floor controller triggers the transmission of a corresponding session control command to the data source.

The aforementioned procedures apply also to scenarios where the floor controller selects itself as the network component being the session controller. Generally, negotiation may be considered in the described push or pull procedures, e.g. for negotiating which session control instructions are available and which can validly be used by the individual network components of the group of network components. A restriction of session control instructions may be related to the status of the session, e.g. at the beginning of the session, session control instructions relating to a restart of the session ("REPLAY") may be acceptable whereas at a later point REPLAY session control instructions are prohibited by the floor controller.

Session control instructions and floor control instructions may be exchanged via dedicated control channels. As has been mentioned above, a floor control channel is a channel that is used for the exchange of floor control instructions for purposes like requesting, granting, or denying session control or floor control, whereas a session control channel is used for the transfer of session control commands and/or of session control instructions. According to this terminology, the direct access is when used for the transmission of session control commands a session control channel. Channels between the individual network components of the group of network components can be either floor control channels or session control channels or both. In principle, one and the same (logical) channel can act both as floor control channel and as session control channel. The establishment of a session control channel can be seen (and thus be implemented) as a floor control instruction, i.e. a request for session control indicated by the starting of the establishment of a session control channel between the network component requesting session control and the floor controller. A non-acceptance of the establishment of the session control channel by the floor controller can also be interpreted (and implemented) as a floor control instruction, i.e. the denying of the request for session control by the floor controller to the network component requesting session control.

After having selected the network component which is to controller the data source, a single session control channel for transferring control instructions may be established between the floor controller and the selected network component. In such a case session control is simply conferred to the selected network component by establishing a session control channel which stretches between the floor controller and the selected network component. This session control channel may be extended to the data source.

According to a further embodiment, session control channels are established between the floor controller and two or more members of the group of network components receiving the data stream. Preferably, such session control channels are provided between the floor controller and each network component of such a group and remain permanent for the time the respective network components participate in the session. In this case the network components may at any time send session control instructions via the corresponding session control channel to the floor controller.

It might be advantageous if for floor control purposes a separate floor control channel is established between the floor controller and at least one of the network components. Such a separate floor control channel allows a separate signaling between the floor controller and individual network components for e.g. requesting, rejecting or denying a session or request for floor control. Of course, permanent floor control channels can be established to all network components of the group of network components.

Preferably, the floor controller performs at least one of an authentication and authorization relating to at least one of the network components and control instructions. The floor controller may authenticate that a specific control instruction has actually been received from a specific network component e.g. by verifying the IP address of the network component from which the control instruction was received. Alternatively or additionally, the floor controller may authenticate the individual members of the group of network components themselves. Such an authentication may for example be performed in context with establishing a session or during a session every time a new member joints the group of network components. The floor controller can also authorize one or more network components. For example when selecting a network component as session controller, the session controller is authorized to send session control instructions. Optionally, the floor controller may restrict the availability of session control instructions and may authorize one or more network components to make use of non-restricted session control commands only.

The method according to the invention can be implemented as a hardware solution and as a computer program product comprising program code portions for performing the individual steps of the method when the computer program product is run on a network component. The computer program product may be stored on a computer readable recording medium like a data carrier attached to or removable from the network component.

The hardware solution includes a floor controller comprising a selection unit for selecting the network component which is to control the data source, a first interface for receiving control instructions from one or more of the network components, the control instructions relating to a control of the data source, and a second interface for triggering, in response to receipt of control of instructions, the transmission of corresponding session control commands to the data source. Preferably, the floor controller further comprises a relaying unit coupled between the first interface and the second interface. The relaying unit may relay control instructions received via the first interface either unmodified to the owner of the direct access or after modification (e.g. in a translated format) to the data source or the owner of the direct access via the second interface. For the case that unmodified or modified control instructions are sent to the owner of the direct access, the floor controller triggers the owner of the direct access to send corresponding session control comments to the data control.

Various implementations of the floor controller are possible. For example, the floor controller may be constituted by a mobile terminal like a personal digital assistant or a mobile telephone. Alternatively, the floor controller may be a stationary component like a personal computer. Furthermore, the floor controller may be configured as an intermediate node like a proxy component that can be arranged e.g. between the data source and an e.g. multicast group of network components which receive the data stream from the data source via the proxy component. The floor controller may also be co-located with the data source by merging the floor controlling network component and the data source into a single physical node.

The floor controller may be part of a communications network that can further comprises the data source. Preferably, the communications network is configured such that the data source receives and/or accepts session control commands only from the floor controller.

The communications network may be a wire-line or a wireless network. Moreover, the communications network may simultaneously comprise at least one wireless component like a mobile telephone and at least one stationary component like a personal computer.

The invention can also be implemented as a user interface of a network component belonging to a group of network components which are configured to receive a data stream from a data source, the user interface comprising a first control element for controlling the data source, the first control element being adapted to be activated to generate a control instruction which is sent to a floor controller selecting the network component that is to control the data source, the control instruction prompting the floor controller to trigger the transmission of a corresponding session control command to the data source.

The user interface may for example be a graphical or a voice controlled interface. The first control means could thus be configured to be activated acoustically, physically (e.g. by pushing a button), by means of a pointing device like a pen or a mouse, or by any other means.

The user interface may further comprise a second control element for requesting session control, the second control element being adapted to be activated to generate a request for session control which is sent to the floor controller and prompts the floor controller to confer session control to the network component which requested session control. Furthermore, a third control element may be provided for requesting floor control, the third control element being adapted to be activated to generate request for a floor control which is sent to the floor controller and prompts the floor controller to confer floor control to the network component which requested floor control. Moreover, a fourth control element may be provided for requesting direct access, the fourth control element been adapted to activated to generate a request for direct access which is sent to the floor controller which prompts the owner of direct access to confer direct access to the network component which requested direct access.

The user interface may further comprise a fifth control element which is adapted to be activated to instruct one of the network components to take over at least one of a session control, floor control, and direct access to the data source.

The second, third, fourth and fifth control elements may be activated in the same manner as described above in context with the first control element.

The user interface may additionally comprise an indicator element for indicating to an operator of the network component that at least one of session control, floor control and direct access has been conferred to him or to an operator of another network component. The indicator element may for example include an optical display or a generator for an acoustical signal like a pre-recorded voice prompt.

BRIEF DESCRIPTION OF THE DRAWINGS

Further aspects of the invention will become apparent from the following description of various embodiments of the invention and upon reference to the drawings, in which:

FIG. 10 is a schematic diagram depicting a second embodiment of a communications network according to the present invention.

DESCRIPTION OF PREFERRED EMBODIMENTS

In the following the invention will exemplarily be set forth with respect to a wireless communications system comprising two or more mobile terminals. It should be noted, however, that the invention could also be used in communications systems comprising only stationary terminals like personal computers or in communications systems comprising both mobile and stationary terminals.

Although the following description focuses on the control of a streaming session, gaming sessions or other sessions may be controlled as well. Furthermore, although in the RTSP scenario discussed below direct access to the data source remains at the session initiator, a different scenario could be deployed as well according to which the direct access to the data source is passed also.

Figure 1:
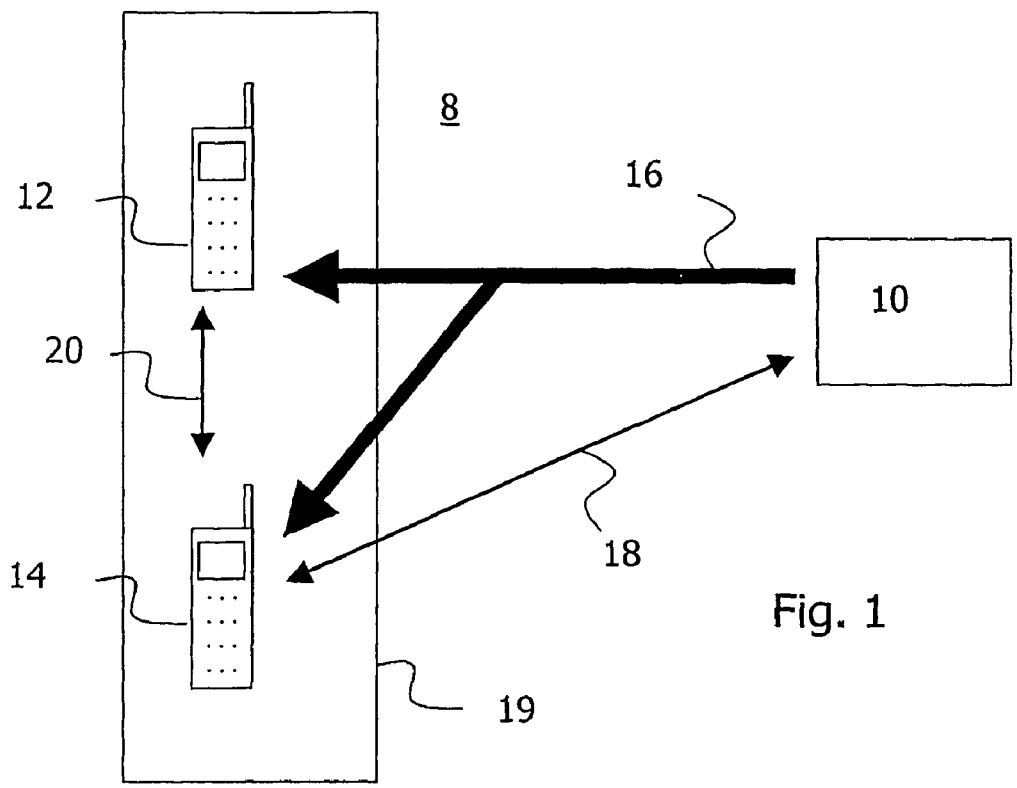
FIG. 1 is a schematic diagram depicting a first embodiment of a communications network according to the present invention.

In FIG. 1 a schematic diagram of a communications network 8 according to the invention is shown. The communications network 8 includes a streaming source 10 in the form of a multimedia server acting as data source and a group of network components 12, 14 which receive a data stream 16 from the streaming source 10.

The exemplary embodiment depicted in FIG. 1 will be explained below in context with a direct floor control scenario. As has been defined above, this means that a network component having direct access to the streaming source 10 additionally has floor control.

Although in FIG. 1 only two network components 12, 14 are depicted, it should be noted that in principle the group of network components could comprise three or more network components also. In the embodiment depicted in FIG. 1 the network components 12, 14 are mobile telephones.

The group of network components 12, 14 constitutes an Internet Protocol (IP) multicasting host group 19. IP multicasting is the transmission of an IP datagram to a host group identified by a single IP destination address. The membership of the group is dynamic. This means that a member may join and leave the group at any time. There is no restriction on the location or number of members in a group. Furthermore, a network component need not be a member of a group to send datagrams to it. An IP multicasting host group may be permanent or transient. A permanent group has a well-known, administratively assigned IP address. It is the address, not the membership of the group, that is permanent. Those IP multicast addresses that are not reserved for permanent groups are available for dynamic assignment to transient groups which exist only as long as they have members. IP multicasting is specified in the IETF document RFC 2236. Internet Group Management Protocol, Version 2, November 1997.

It should be noted that the invention is neither limited to multicasting nor to IP multicasting. Nevertheless, the invention is preferably based on multicast technology. Thus the data stream 16 from the streaming source 10 is preferably not broadcasted to everyone connected to the communications network 8, but only sent to a group 19 of selected network components 12, 14.

As can be seen from FIG. 1, the data stream 16 from the streaming source 10 is received by every member 12, 14 of the multicast group 19 of network components. It also becomes apparent, however, that only the floor controlling network component (direct floor controller) 14 has a direct access in the form of a session control channel 18 to the streaming source 10.

Receiver reports related to the data stream 16 may be sent from the network components 12, 14 to the data source 10 or to each other. However, receiver reports and channels for sending receiver reports are not depicted in anyone of the Figures and will not be considered. The streaming source 10 will receive session control commands only from the direct floor controller 14, but not from any other member of the multicast group 19.

In the embodiment depicted in FIG. 1 the session control channel 18 is used for an RTSP based control of the streaming source 10. In accordance with RTSP, the session control channel is thus used for both establishing and controlling the data stream 16. Streaming protocols and other protocols different from RTSP could be used alternatively or additionally.

Between the floor controlling network component 14 and the non-floor controlling network component 12 of the multicast group a control channel 20 is established. This channel 20 can be used on the one hand for sending floor control instructions (floor control channel) and on the other hand for transmitting control instructions relating to a control of the streaming source 10 (session control channel) from non-floor controlling network component 12 to the floor controlling network component 14. Corresponding channels 20 can be established between the floor controlling network component and any other network component of the group of network components, e.g. the multicast group 19.

Upon receipt of a session control instruction, the floor controlling network component 14 determines whether or not the session control instruction is admitted to control the streaming source 10. Since in the embodiment depicted in FIG. 1 the multicasting group 19 consists of only two network components, namely the floor controller 14 and the other network component 12, the floor controlling network component 14 selects in this context either itself or the single other network component 12 of the multicast group 19 as the network component which is to control the streaming source 10. If the floor controlling network component 14 selects itself as the network component which is to control the streaming source, the floor controlling network component 14 ignores or rejects the session control instructions received from the other member 12 of the multicast group 19. Otherwise, the floor controlling network component 14 authenticates (e.g. via the IP address of the network component 12) any control instructions received from the network component 12. After successful authentication, the floor controlling network component 14 translates the control instructions into corresponding RTSP session control commands and transmits them via the session control channel 18 (direct access) to the streaming source 10.

In the following, the signaling involved in setting up a streaming session and performing floor control will be described in more detail with reference to FIG. 2. In the signaling scenario described hereinafter, it is supposed that the network component 14 acts as initiator of the streaming session on the one hand and as (initial) direct floor controller on the other hand. The reason for this is the fact that the network component 14 initiating the streaming session will usually be charged for using this service. Consequently, this network component 14 should also have the (initial) right to control the streaming source 10 and to decide when and to whom the right to control the streaming source 10 is passed. This, however, does not exclude that the network component 14 initially controlling the floor passes this right temporarily or completely to another member of the multicast group 19.

In order to prevent for theft-of-service or denial-of-service, the current floor controller preferably knows all participants in the multicast group. This can be achieved by inviting the participants to the group 19.

Figure 2:
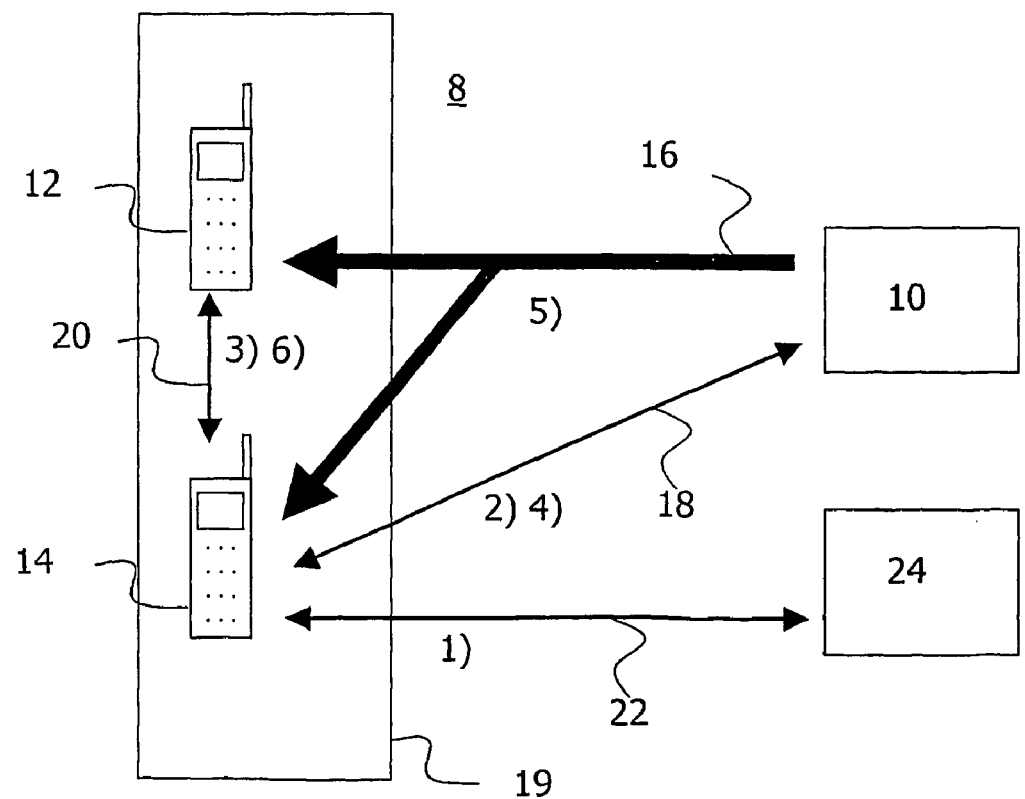
FIG. 2 shows the process of establishing and controlling a streaming session in the communications network of FIG. 1.

Referring to FIG. 2, setting up of a streaming session will now be described.

In a first step 1) the network component 14 (the future direct floor controller) which intends to initiate an IP multicast streaming session requests a corresponding multicast address in accordance with the Multicast Address Dynamic Client Allocation Protocol (MADCAP) described in the IETF document RFC 2730; December 1999. To that end, the network component 14 transmits a MADCAP request via a communications channel 22 to a MADCAP server 24. The MADCAP server 24 responds with a new (unused) IP multicast address from the public or Gi address space.

After having obtained a valid multicast address from the MADCAP server 24 in step 1), the network component 14 starts in step 2) the RTSP signaling sequence with a content server acting as streaming source 10. To that end, the network component 14 posts the IP multicast address with the appropriate RTSP message via the session control channel 18 to the streaming source 10. In step 2) the streaming source 10 transmits a session description for the specific content including transport formats and ports, etc. via the session control channel 18 to the network component 14. After the SETUP message the standard RTSP signaling sequence is paused to establish the multicast group 19 next. Preferably, the network component 14 initiating the streaming session has already joined the multicast group 19 immediately after having obtained the multicast address from the MADCAP server 24 in step 1).

In the scenario described above, the MADCAP server 24 chooses the IP multicast address for the streaming session. According to an alternative scenario, the streaming source 10 could be configured to choose or request an IP multicast address and provides this to the network component 14.

In step 3) one or more further network components are invited to join the multicast group 19. In the embodiment depicted in FIG. 2, the multicast group 19 consists of only two network components, namely the network component 14 which initiates the multicast session and which (initially) acts as direct floor controller on the one hand and a single further network component 12 on the other hand. In step 3) the floor controlling network component 14 informs the network component 12 of the multicast address and ports using standard SIP signaling as described in the IETF document RFC 2543; SIP: Session Initiation Protocol; March 1999. The SIP invitation contains the Session Description Protocol (SDP) which was obtained from the streaming source 10 during the RTSP set up. Alternatively, if the SDP is not provided from the streaming source to the invited parties, the RTSP session set up can be done after SIP invitation.

By means of SIP, the network component 14 initiating the streaming session transmits the SDP previously received for the requested content from the streaming source 10 to the other network component 12, e.g. via the control channel 20. In the case content encryption is used, the SDP additionally contains the URL to the content encryption key (CEK) server not depicted in FIG. 2. The other network component 12 may then request the CEK from this server. It is assumed here that the transmitted SDP is not encrypted.

After having received a feedback on the SIP invitation message from the invited network component 12, the network component 14 initiating the streaming session issues an RTSP PLAY command to the streaming source 10 via the session control channel 18 (step 4). In response to receipt of the PLAY command, the streaming source 10 plays out the data stream 16 to the multicast address joined by the network components 12, 14 of the multicast group 19 in step 5).

Until now the process of establishing the streaming session has been described. Although the network component 14 having initiated the streaming session shares the streaming media with at least one other network component 12 belonging to the same multicast group 19, the at least one further member of 12 of the multicast group 19 is just able to receive the data stream 16. In other words, only the network component 14 having initiated the streaming session controls the streaming session using commands PLAY, PAUSE, REWIND, ZOOM, etc.

If the invited member 12 of the multicast group would like to control the streaming session, it sends in step 6) a request for session control or a session control instruction relating to a control of the streaming source 10 via the channel 20 to the floor controlling network component 14. As has been mentioned above, the channel 20 may simultaneously constitute a floor control and a session control channel.

In the following, different scenarios for the signaling between the network component 12 requesting session control and the floor controlling network component 14 will be described in more detail in a sense that channel 20 is firstly a RTSP connection and secondly a SIP session.

According to a first scenario, in step 6) of FIG. 2 RTSP (i.e. a connection oriented protocol) is used on top of the Transmission Control Protocol (TCP) for the signaling between the floor controlling network component 14 and any other network component 12 of the multicast group 19. It should be noted that the RTSP session control channel 18 between the floor controlling network component 14 and the streaming source 10 is independent from the one or more further RTSP connections between the floor controlling network component 14 and the one or more network components 12 of the multicast group 19. Usually, not all RTSP methods need to be available for the signaling between the floor controlling network component 14 and any other network component 12 of the multicast group 19. For example, the RTSP method DESCRIBE is not necessary, whereas SETUP is used for connection establishment. Furthermore, the number and usage of RTSP methods can be restricted via the OPTIONS method, e.g. for reason of negotiation purposes.

The RTSP connection may remain established during the whole streaming session or may only temporarily be established while the non-floor controlling network component 12 has session control. If the network component 12 has session control, it sends session control instructions in the form of appropriate RTSP commands like PLAY or PAUSE to the floor controlling network component 14. The direct floor controlling network component 14 translates the received control instructions into a format (including e.g. a correct command sequence number, CSEQ) which can be understood by the streaming source 10.

An individual RTSP connection may be established only when required for floor or session control purposes between the floor controlling network component and a single further member of the multicast group. By accepting, rejecting or tearing down the RTSP connection, the floor controlling network component can indicate decisions relating to floor control to the other members of the multicast group. On the other hand, one may also think of simultaneously establishing RTSP connections between the floor controlling network component and all other network components of the multicast group and to maintain these RTSP connections active during the time of the session. Necessary floor control instructions can be exchanged between the floor controlling network component and other network components via the RTSP SET and GET methods. By doing this, the session control channel and the floor control channel are merged into a combined control channel.

The direct access based on RTSP (on top of TCP) cannot be moved from the network component that initiates the RTSP session to another (physical) network component. This means that the direct access based on RTSP stays with the RTSP session initiator and that the client-server RTSP association is not changed. Logically, however, session control can be moved. In the embodiment described above, the RTSP session initiator and the (initial) floor controller are constituted by one and the same network component, i.e. network component 14 acting as direct floor controller. The RTSP session initiator acts also as a relay unit for session control commands.

According to a second scenario, SIP (i.e. a session oriented protocol) could be used. According to the SIP based scenario, floor control signaling is performed by means of SIP extensions. To that end, either new extensions can be defined or existing ones reused. An example for SIP based floor control can be found in IETF Internet Draft draft_wu_sipping_floor_control—01.txt "Use of SIP and SOAP for Conference Floor Control", Wu/Koskelainen/Schulzrinne/Chen, Apr. 19, 2002, Columbia University.

In the following, conferring session control to a non-floor controlling network component will be discussed in more detail. According to a first variant, the floor controlling network component explicitly instructs another network component of the multicast group to take over session control (push mechanism). The network component to which network control has been conferred now has the right to control the streaming source as long as this right is not revoked by the floor controlling network component. Revocation of this right may be signaled in advance to the network component which temporarily acts as session controller.

According to a second variant, a network component of the multicast group which does not have session control may request session control from the floor controlling network component (pull mechanism). This can be done in various ways. For example, a request for session control which does not contain any indication relating to a specific session control command may be sent to the floor controlling network component. Instead of a such an explicit request for session control, a session control instruction may be sent to the floor controlling network component. The floor controlling network component then interprets this instruction as (an implicit) request for session control.

In the pull-based session control variant, the floor controlling network component has various alternatives regarding the handling of a request for session control. Basically, the floor controlling network component may either accept, reject or ignore the request for session control. A request for session control may be accepted silently or may be expressly acknowledged. In response to an expressly acknowledged request for session control, the network component requesting session control may send a control instruction relating to a control of the streaming source to the floor controlling network component. This session control instruction is then, if necessary, transformed into the appropriate session control command and forwarded to the streaming source.

If the floor controlling network component is not willing to accept a request for session control, it may either ignore or reject the request for session control. When ignoring the request for session control, the floor controlling network component silently discards the request. When rejecting the request for session control, the floor controlling network component sends a corresponding message back to the network component which requested session control.

In the case the floor controlling network component accepts a request for session control, it may specify a duration during which session control is conferred. Such a duration can also be specified prior to the streaming session and stored in a preference database of the floor controlling network component. The maximum duration during which session control is conferred should be the session lifetime.

The above discussion relates to a virtual session control hand over because even if the floor controlling network component confers session control to another network component of the multicast group, every instruction which is generated by the network component to which session control was handed over will be relayed to the streaming source via the floor controlling network component, that has direct access to the streaming source. Now some mechanisms are described for transferring floor control from one network component to another.

In principle, floor control could be handed over in the same manner as described above with respect to session control, e.g. upon a request for floor control from a non-floor controlling network component (pull mechanism) or by expressly instructing a non-floor controlling network component to take over floor control (push mechanism). Once floor control has been passed from one network component to another, all participating network components of the multicast group have to be informed accordingly to ensure that from now on all requests for session or for floor control are sent to the new floor controller. Additionally, it may become necessary to inform the streaming source accordingly because the streaming source may want to verify that only a single particular network component is in charge of the floor control.

If the initial or a previous floor controlling network component wants to get back floor control, the mechanisms described above with respect to transferring floor control may be used. According to a preferred embodiment, however, the mechanism for passing floor control is configured such that a request for floor control can not be ignored or rejected if it stems from a specific network component like the initial floor controller. In such a case it might become necessary to enable an identification of the initial floor controller. For this purpose, a corresponding descriptive field in the floor control instructions might be provided.

Furthermore, a rule might be established according to which all control instructions relating to floor control must pass a specific network component like the initial floor controller, especially if floor control would pass among network components of the multicast group which not have had the initial floor control.

Figure 3:
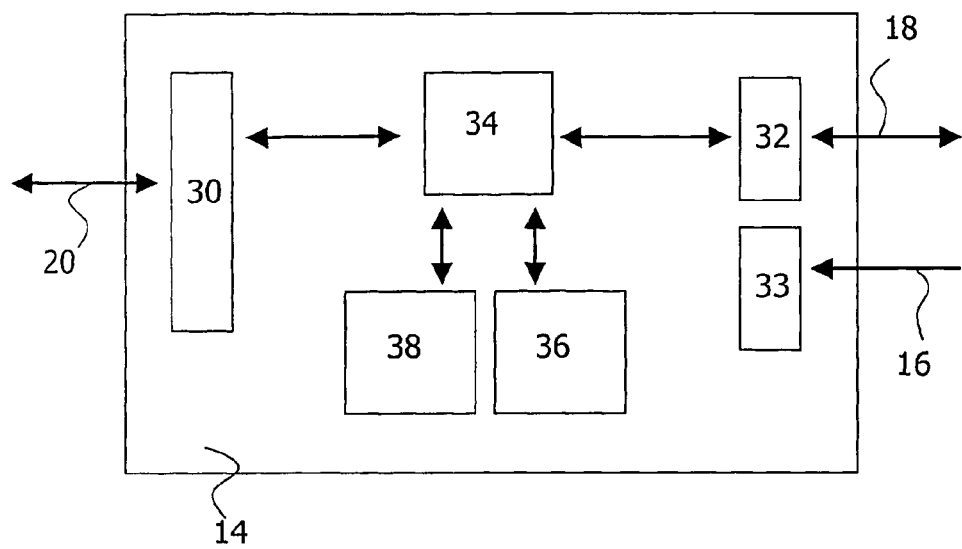
FIG. 3 shows a schematic diagram depicting an embodiment of the floor controller according to the present invention.

In FIG. 3, a schematic diagram of a floor controlling network component 14 having direct access to a streaming source via a session control channel 18 is depicted. As becomes apparent from FIG. 3, the network component 14 comprises a first interface 30 for communicating with non-floor controlling network components via the channel 20. The first interface 30 enables receipt of control instructions relating to a control of the streaming source. The floor controlling network component 14 further comprises a second interface 32 for transmitting session control commands via the session control channel 18 to the streaming source. A third interface 33 of the network component 14 enables receipt of the data stream 16 from the streaming source.

A relaying unit 34 is coupled between the first interface 30 and the second interface 32. The relaying unit 34 is configured to translate (if necessary) control instructions and to relay the modified or non-modified control instructions via the second interface 32 as session control commands to the streaming source.

The floor controlling network component 14 further comprises a unit 38 for generating control instructions relating to a control of the streaming source. The unit 38 is coupled to the relaying unit 34 so that the relaying unit 34 may also relay a control instruction received from the unit 38, i.e. generated within the floor controlling network component 14 itself, via the second interface 32 to the streaming source.

The floor controlling network component 14 further comprises a selection unit 36 coupled to the relaying unit 34 and the second interface 32. The selection unit 36 has the task of selecting the network component which is to control the streaming source. The selection unit 36 is configured such that it may also select the floor controlling network component 14 itself as the network component which is to control the streaming source. The selection unit 36 informs the relaying unit 34 of the network component which currently has session control, i.e. of the network component from which control instructions are currently accepted for being relayed to the streaming source. Thus, the selection unit 36 performs floor control.

In the present embodiment, the floor controlling network component 14 is the RTSP session initiator and has direct access via the session control channel 18 to the streaming source. In accordance with RTSP, the RTSP session can only logically, but not physically be moved from the floor controlling network component 14 to another network component.

However, for scenarios where floor control and/or direct access can be conferred, additional or modified units and interfaces can be implemented.

Figure 4A:
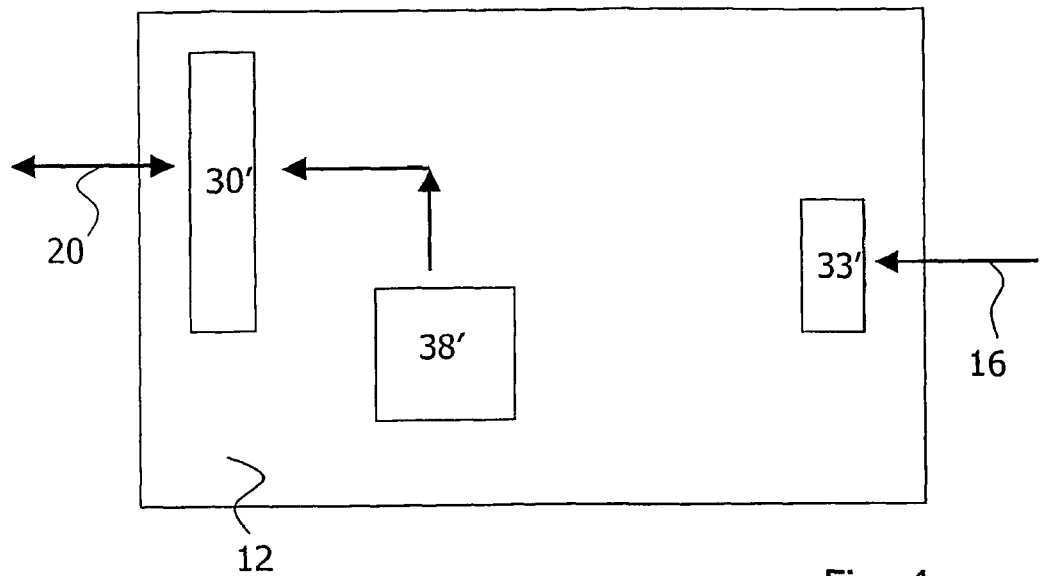
FIGS. 4a, 4b show a schematic diagram depicting an embodiment of an non-floor controlling network component according to the present invention in two different states.

In FIG. 4a, a schematic diagram of a session controlling network component 12 is depicted. As becomes apparent from FIG. 4a, the network component 12 comprises a first interface 30' for communicating with the floor controlling network component described above with reference to FIG. 3. The first interface 30' enables transmission of control instructions relating to a control of the streaming source and/or floor control instructions. The session controlling network component 12 further comprises a second interface 33' which enables receipt of the data stream 16 from the streaming source. Additionally, a unit 38' for generating control instructions relating to a control of the streaming source and for requesting floor control is provided. If the network component 12 is selected as session controller, all control instructions from the unit 38' are relayed via the first interface 30' and the channel 20 to the floor controller.

Figure 4B:
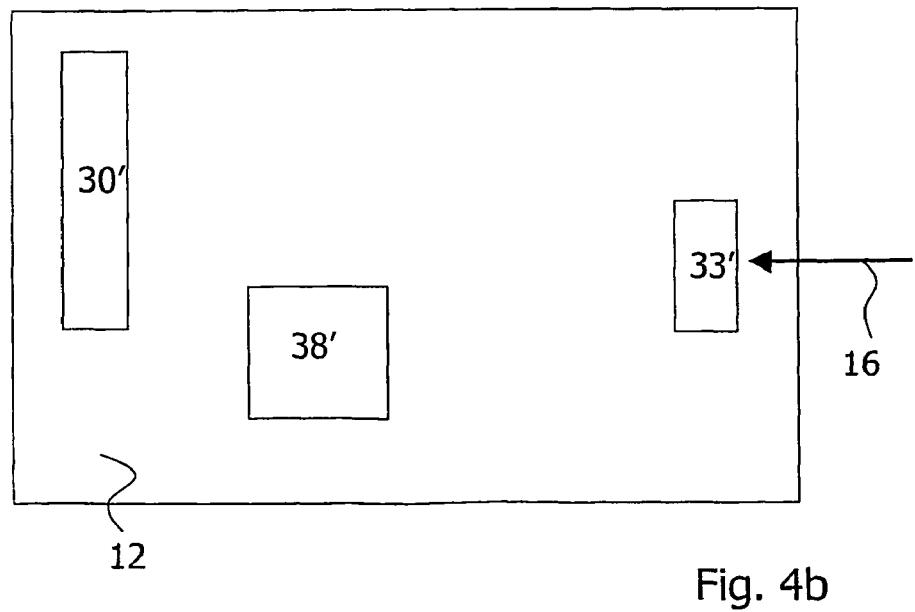

FIG. 4b shows the network component 12 when it does not have session control. In the present embodiment the existence of the channel 20 (see FIG. 4a) to the floor controlling network component indicates whether or not the network component 12 has session control. In the case the floor controlling network component does not accept set up of the channel 20, this means a rejection of a corresponding request from the network component 12. On the other hand in the case the floor controlling network component accepts set up of the channel 20, this means that a corresponding request is granted.

Instead of a session control process which depends on the existence of the channel 20, an alternative session control process could be used. In the alternative session control a dedicated floor control channel and a dedicated session control channel are provided. The floor control channel is used for purposes including requesting, granting or denying session control, whereas the session control channel is used for the transfer of explicit session control commands or of control instructions that can be interpreted into session control commands. Both channels can remain permanently established within the session life time, the time the session controller joins the session, or for the time the session controller has session control.

The floor control channel can be mapped onto a multicast group so that all interested network components can listen to the floor control channel and are updated immediately. Alternatively, a unicast floor control channel can be maintained between each non-floor controlling network component and the floor controlling network component.

The floor control channel is used to send specific control commands either to the entire group of network components or to individual network components. Such specific control command may include a request for session control, release of session control, grabbing of session control and, if required, informative commands including information about the network component which is currently controlling the session. Additionally, information may be provided about the network component that is currently controlling the floor. Information about the floor controlling network component, however, is usually only necessary in the case the floor control can be passed to another network component. In this case the floor controlling network component is not necessarily the session initiator.

According to a further variant of the invention, an anarchical floor control procedure may be implemented. In such a case only a session control channel, but no floor control channel, remains established between involved network components and a dedicated network component having a task comparable to that of a floor controller. The task of this dedicated network component is to mix or merge session control instructions from the involved network components. The relay unit 34 (see FIG. 3) of such a dedicated network component mixes the session control instructions from several channels 20 onto the channel 18 in a format readable by the data source. The dedicated network component may be a discrete network node or may be co-located with the data source.

Such an anarchical floor control procedure is especially advantageous in the case of gaming sessions. RTSP can be used for control of such gaming sessions. Alternatively, specific gaming control protocols could be used.

Figure 5:
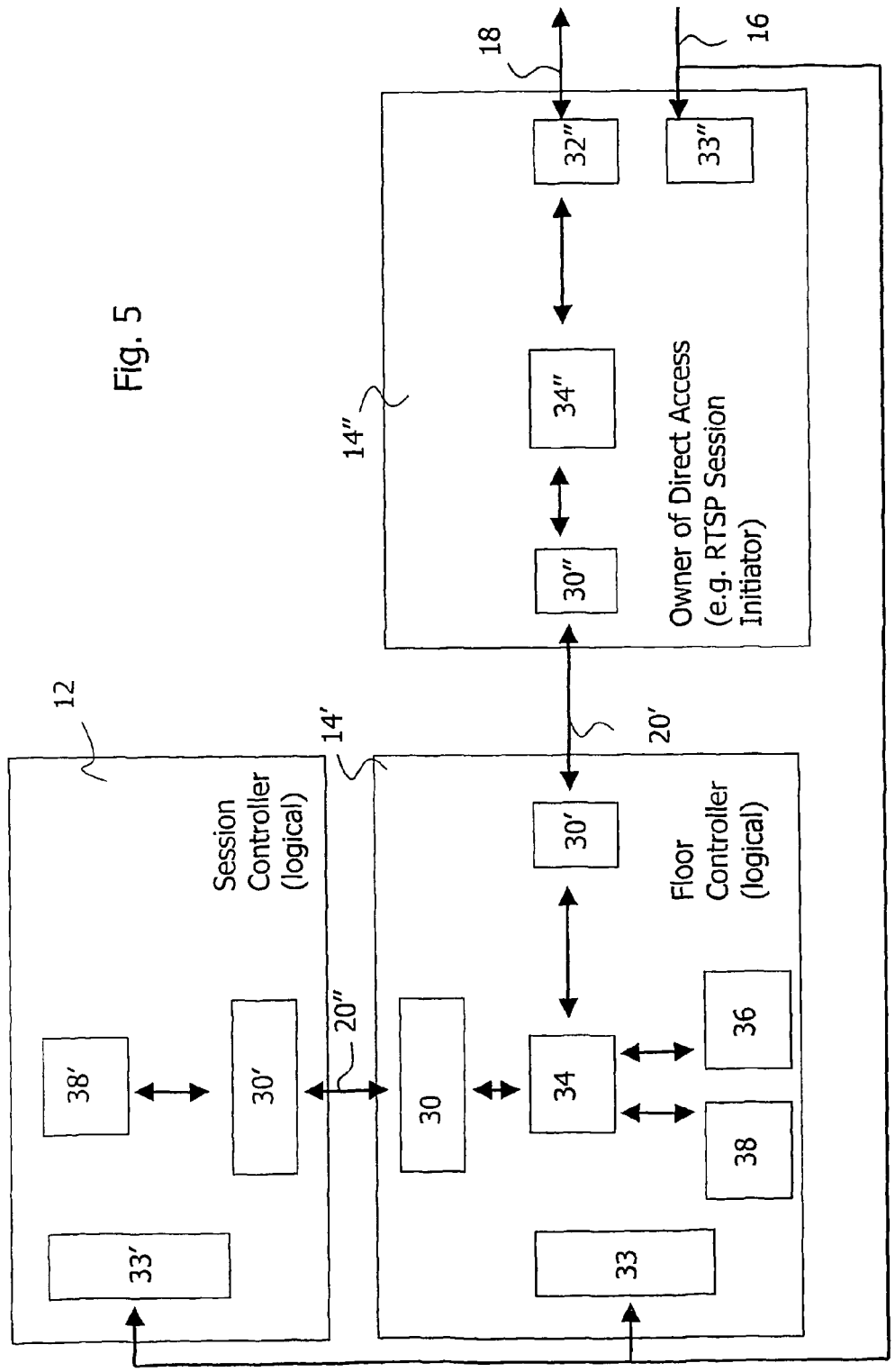
FIG. 5 shows a schematic diagram depicting an RTSP scenario including a plurality of individual network components according to the present invention.

In FIG. 5 a scenario with a logical session controlling network component 12, a logical floor controlling network component 14' and a network component 14" owning the direct access to the data source is depicted. For an implementation based on RTSP, the owner of the direct access is the RTSP session initiator. The individual units and interfaces of the network components 12, 14', 14" correspond to the individual units and interfaces described above with reference to FIGS. 1 to 4b.

In accordance with RTSP, the session initiating network component 14" has permanent direct access via its interface 32" and the RTSP session control channel 18 to the streaming source which is not depicted in FIG. 5. The relay unit 34" of the session initiating network component 14" is an optional unit which filters any commands received from the floor controlling network component 14' to ensure that only specific session control commands are forwarded to the streaming source, e.g. to restrict children's access to specific functions or contents. Alternatively, the relay unit 34" can be triggered by the floor controller, e.g. by the unit 34, to translate session control instructions into session control commands to be sent to the date source.

The session controlling network component 12 and the floor controlling network component 14' are operated as described above with reference to FIGS. 1 to 4b. It should be noted that the floor controlling network component 14' has an additional interface 30' for communicating via the channel 20' with the session initiating network component 14" having direct access to the streaming source. The channel 20' is extended from the floor controlling network component 14' via the channel 20" to the session controlling network component 12.

In the scenario depicted in FIG. 5, the session initiating network component 14" (after having initiated an RTSP session) has conferred floor control to the floor controlling network component 14'. This has the advantage that the session initiating network component 14" is now set free from floor control and may execute additional tasks. Thus, floor control has logically been passed from the session initiating network component 14" to another network component 14'. Passing floor control in this context means to pass the logical selection unit 36 to another network component 14'.

When the scenario as depicted in FIG. 5 changes, e.g. when conferring at least one of session control, floor control, and owning of the direct access from one network component to another, units and/or interface and/or internal links of the respective network components and/or channels between the respective networks components may have to be adjusted accordingly, e.g. logically passed, activated or deactivated. For example, if session control is conferred from the session controlling network component 12 of FIG. 5 to the network component 14" that owns the direct access, channel 20" might no longer be used in correspondence with FIG. 4b. The interface 30' and the unit 38' may become deactivated. In addition, a corresponding session control unit 38' (not depicted) may be activated or added on the side of the owner of the direct access 14". Session control instructions generated by the corresponding session control unit 38" can be sent via relay unit 34" and interface 30" to the floor controlling network component, e.g. via the existing session control channel 20'.

Figure 6:
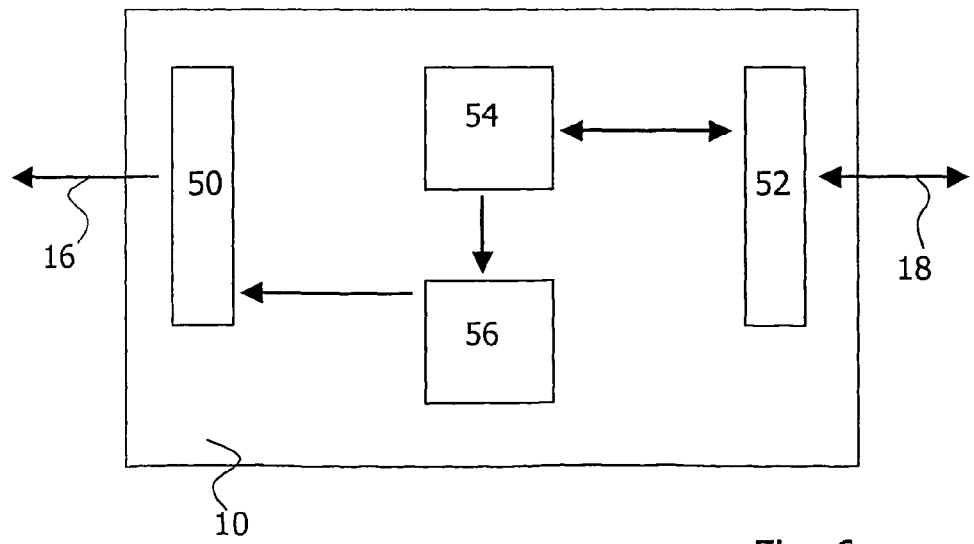
FIG. 6 shows a schematic diagram depicting a streaming server.

FIG. 6 shows a schematic diagram of the streaming source 10. It should be noted that the streaming source is usually not affected by the invention unless the direct access is passed.

The streaming source 10 comprises a first interface 50 for transmitting the data stream 16 to the multicast group. A second interface 52 of the streaming source 10 is provided for receiving session control commands from the floor controlling network component via the session control channel 18 or, in the case that the floor controller has not direct access from the network component owning the direct access.

The streaming source 10 further comprises a control unit 54 which is coupled to the second interface 52. The control unit 54 is configured such that it accepts session control commands only if they have been generated by the floor controlling network component or, in the case the floor controller does not have direct access to the streaming source, by the network component having direct access.

A unit 56 for generating the multimedia data stream 16 is coupled to both the first interface 50 and the control unit 54. The control unit 54 controls the unit 56 in response to session control commands received via the second interface 52.

Now several Graphical User Interfaces (GUIs) according to the invention for operating the floor controlling network component and a network component which does not have floor control will be described with reference to FIGS. 7 to 9.

Figure 7:
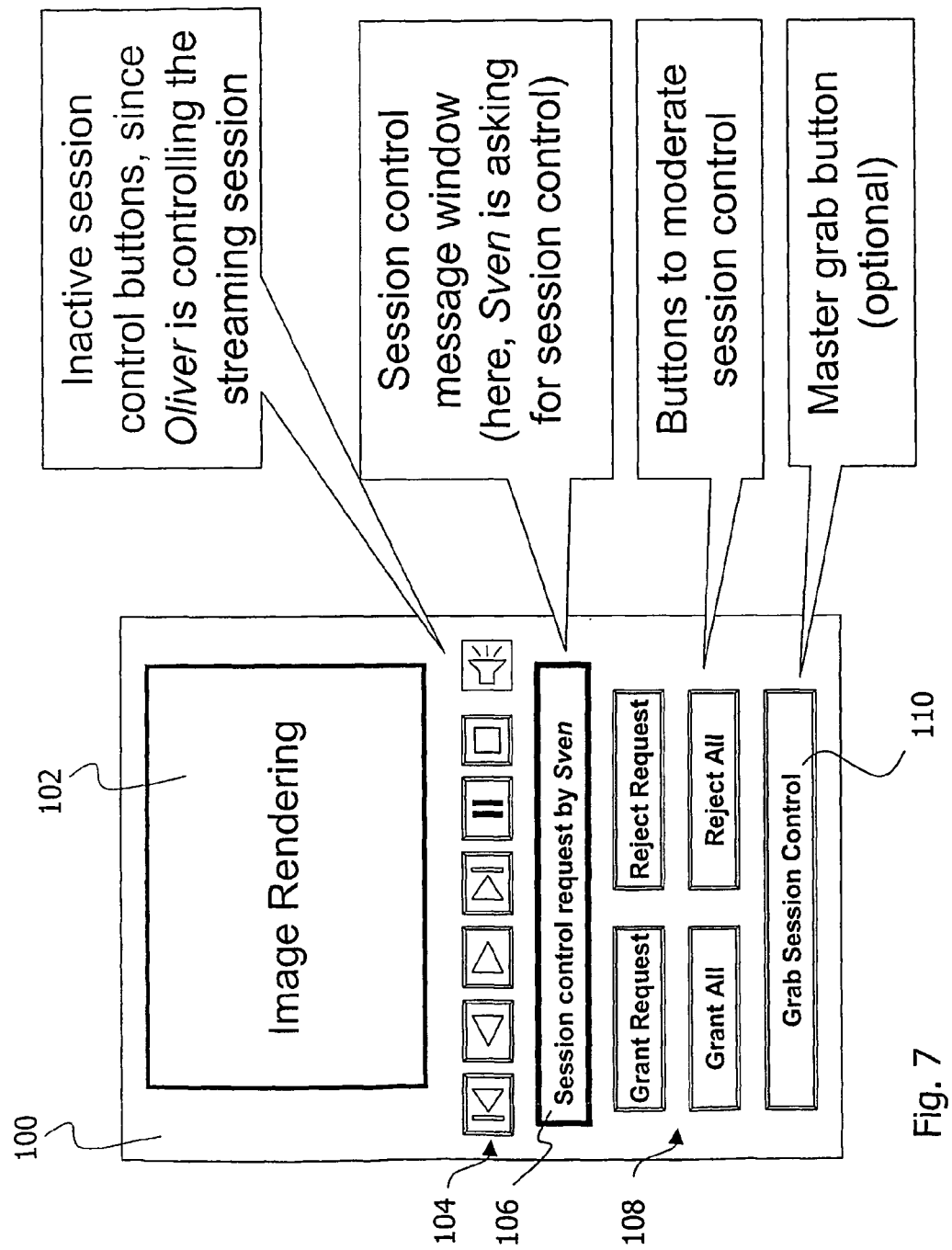
FIG. 7 shows a graphical user interface according to the present invention of the floor controller depicted in FIG. 3.

In FIG. 7 the GUI 100 of the floor controlling network component is depicted. As becomes apparent from FIG. 7, the GUI comprises an area 102 for image rendering, a plurality of session control buttons 104, a session controller indication window 106, buttons 108 for granting or rejecting individual or all request for session controls, and a master button 110 for grabbing session control. The plurality of session control buttons 104 is optional for the case that the floor controller has session control.

In the status depicted in FIG. 7, the session control buttons 104 are deactivated (white), because session control has been conferred to the network component operated by a person named Oliver. In the display window 106 a request for session control from a network component operated by a person named Sven is displayed. By activating one of the floor moderation buttons 108, the request for session control from Sven could be expressly granted or rejected. Additionally, Sven's request for session control may be ignored by refraining from activating the floor moderation button 108. If the user of the floor controlling network component wants to get session control back from Oliver, he may simply activate the master grab button 110.

Figure 8:
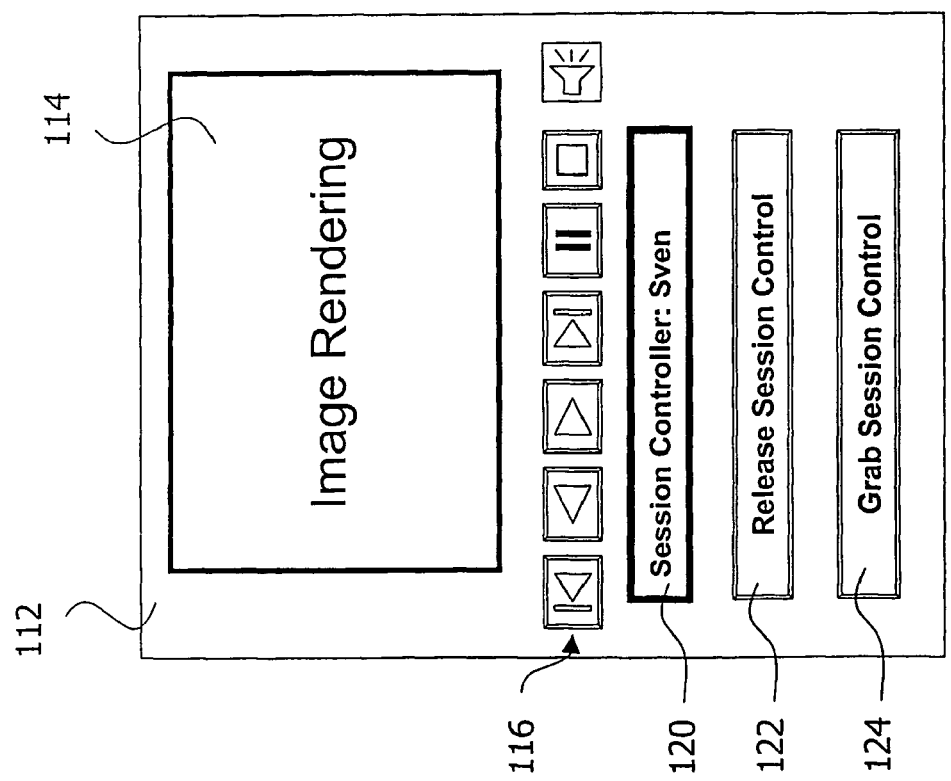
FIG. 8 shows a schematic diagram of a first embodiment of a graphical user interface according to the invention of a network component not having session control.

In FIG. 8 a GUI 112 of a network component which has neither session nor floor control is depicted. The GUI 112 comprises an area 114 for image rendering, a plurality of (deactivated/white) session control buttons 116, a session controller indication window 120, a button 122 for releasing session control and a button 124 for grabbing session control. The GUI 112 depicted in FIG. 8 could be used if a permanent session control channel is established to the floor controlling network component. However other connections are possible also, e.g. via non-permanent channels or sending messages comprising one or more session control instructions, e.g. via SMS.

As becomes apparent from the indication window 120, the streaming session is currently controlled by the network component operated by Sven. The button 122 for releasing session control as well as the session control buttons 106 are not active because the streaming session is currently controlled by another network component. This means that the network component with the GUI 112 depicted in FIG. 8 currently does not have session control. Session control may however be requested by activating the "grab session control" button 124. A permanent session control channel to the floor controller for sending the corresponding floor control instruction can be used.

Figure 9:
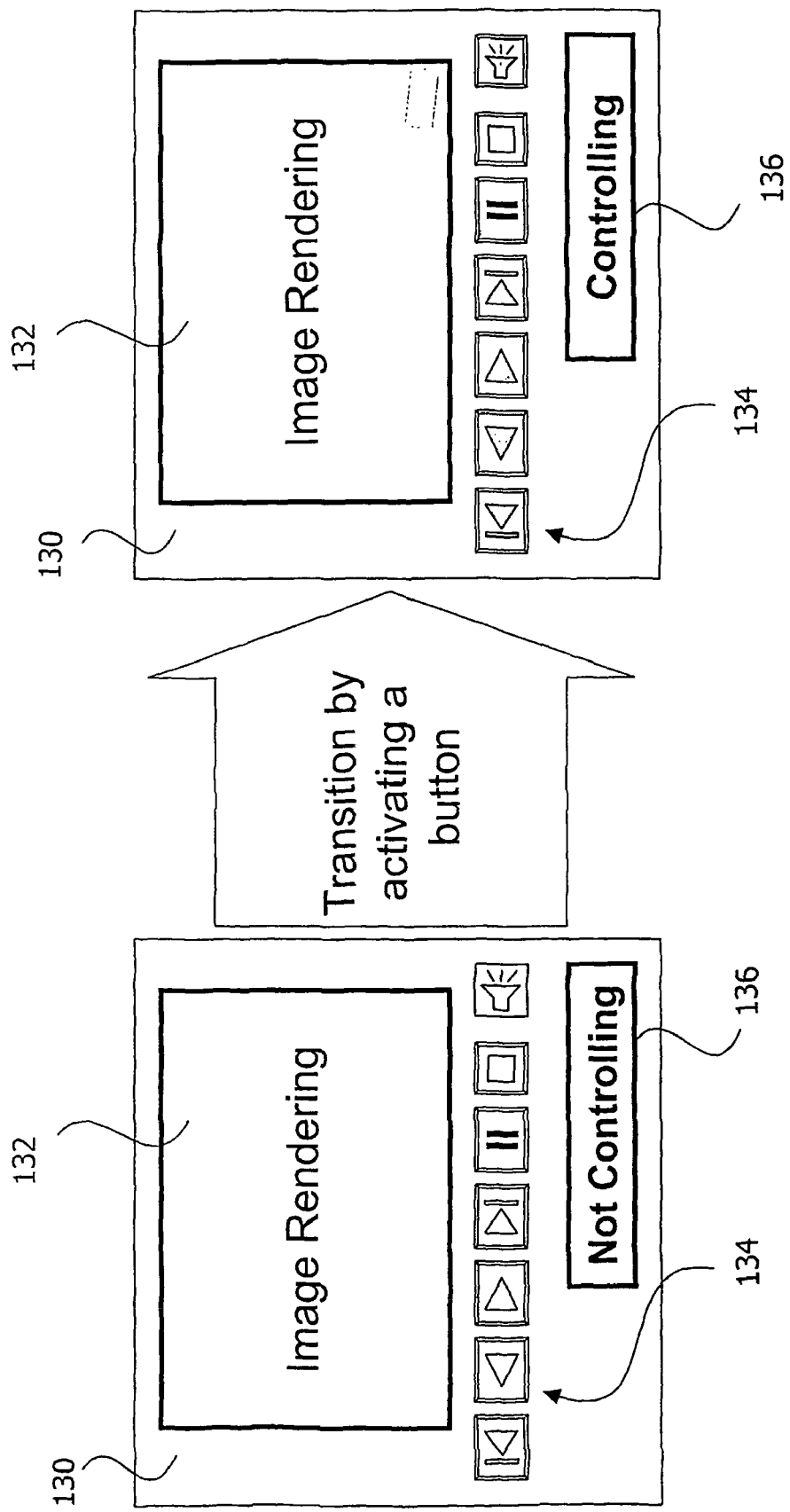
FIG. 9 shows a schematic diagram of a second embodiment of a graphical user interface according to the invention of a network component obtaining session control.

In FIG. 9 the transition of a GUI 130 of a network component which requests and obtains session control is depicted. The GUI 130 comprises an area 132 for image rendering, a plurality of session control buttons 134 and a session control indication window 136.

In the state of the GUI 130 depicted on the left side of FIG. 9, the network component does not have session control. This becomes apparent from the fact that the session control buttons 134 are deactivated and the indication window 136 displays the text "not controlling".

By activating one of the session control buttons 134 a corresponding session control instruction is generated and sent to the floor controlling network component. The floor controlling network component interprets this session control instruction as a request for session control and decides whether or not to confer session control to the requesting network component. In addition, the requesting network component can be informed by the floor controlling network component that session control has been conferred to it. In response to receipt of this information, the GUI 132 of the network component that requested session control changes as becomes apparent from the right side of FIG. 9. The session control buttons 134 become activated (grey) and the indication window 136 displays "controlling".

In the embodiments discussed above it has been assumed that the floor controlling network component belongs to the group 19. However, this need not necessarily be the case. As depicted in FIG. 10, the floor controlling network component may for example be configured as an intermediate node like a proxy component 140 interfacing the streaming source 10 and the group 19. In such a case the session control channel carrying session control commands is established between the proxy 140 and the streaming source 10. Furthermore, the session and floor control channels 20 can be established between the proxy 140 and the individual members 12, 12' of the multicast group 19. The function and operation of the proxy 140 correspond to the function and operation of the floor controlling network component 14 described above with reference to FIGS. 1 to 3. The proxy 140 thus corresponds to a direct floor controller. It should be noted, however, that the proxy 140 may or may not receive the data stream 16 from the data source 10.

According to an additional embodiment of the invention not depicted in the drawings, an optional data delivery pipe could be implemented. Until now, mainly multicast has been considered as data delivery means (connection 16). Alternatively, an intermediate node 140 as depicted in FIG. 9 could provide individual streams via a unicast delivery channel. Session and floor control remain the same, but additionally, the intermediate node has to know the IP addresses of all members of the group of network components which receive the data stream from the data source. The data stream is replicated in the intermediate node and forwarded on unicast channels to the individual group members.

According to a further embodiment of the invention not depicted in the drawings, the (initial) floor controller may also be the streaming server itself (at least until floor control is handed over to one of the other network components, e.g. in response to a request for floor control by one of the other network components). In such a case the streaming source (initially) acts as floor controlling network component.

As has become apparent from the above discussion, the invention enables an improved session control and floor control in general and an improved user influence on the session control in particular. Such an improved session control is especially preferred in sessions like streaming sessions. The invention is thus especially useful if multi-user services like distance learning, collaborative working, tele-medicine, gaming, video-conferencing etc. are deployed, e.g. in wireless communications networks. However, the invention may also advantageously be used in a stationary environment or in an environment which comprises both mobile and stationary devices.

While embodiments of the present invention have been shown and described, various modifications may be made without departing from the spirit and scope of the present invention, and all such modifications and equivalents are intended to be covered.

The invention claimed is:

1. A method of controlling a floor controller device, the floor controller device being a network component belonging to a group of network components in a communications network, the group of network components configured to receive a data stream from a data source, the method comprising the steps of:
   the floor controller device selecting from the group of network components, a network component for controlling the data source;
   receiving a control instruction from the selected network component of the group of network components, the control instruction relating to a control of the data source; and
   in response to receipt of the control instruction from the one of the group of network components, the floor controller device triggering translation of the control instruction into an appropriate session control command and forwarding the session control command to the data source.

2. The method of claim 1, wherein the step of receiving a control instruction includes controlling the data stream.

3. The method of claim 1, further comprising the step of the floor controller device initiating a streaming, gaming or gambling session as part of the data stream.

4. The method of claim 1, further comprising the floor controller device conferring direct access to the data source and floor control, temporarily to one of the group of network components.

5. The method of claim 1, further comprising the step of the floor controller device passing control of the data source by instructing one of the network components to take over session control upon receipt of a request for session control from one of the network components.

6. The method of claim 1, further comprising, establishing a session control channel for receiving control instructions only between the floor controller device and the selected network component of the group of network components.

7. The method of claim 1, further comprising, establishing session control channels for receiving control instructions between the floor controller device and two or more network components of the group of network components.

8. The method of claim 1, further comprising establishing a floor control channel between the floor controller device and one of the network components.

9. The method of claim 1, the floor controller device performing one of an authentication and authorization relating to one of the network components and control instructions.

10. A floor controller device, the floor controller device being a network component belonging to a group of network components in a communications network, the group of network components being configured to receive a data stream from a data source, the floor controller device comprising:
    a processor;
    a memory coupled to the processor;
    persistent storage, associated with the processor for storing instructions to control the floor controller;
    a selection unit for selecting one of the group of network components to control the data source;
    a first interface for receiving control instructions from the one of the group of network components, the control instructions relating to a control of the data source; and
    a second interface for the floor controller device triggering, in response to receipt of control instructions from the selected one of the group of network components, translation of the control instruction into an appropriate session control command and forwarding the session control command to the data source.

11. The floor controller of claim 10, wherein the floor controller device is a mobile or stationary terminal and is configured as a proxy component or is co-located with the data source.

* * * * *